DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 733

T884,013

SILVER HALIDE REVERSAL COMPOSITIONS

Norman Wayne Kalenda, % Eastman Kodak Co., Kodak Park Division, Rochester, N.Y. 14650

Filed Apr. 23, 1970, Ser. No. 31,384
**Int. Cl. G03c *1/08***
U.S. Cl. 96—102
No Drawing. 17 Pages Specification

Improved silver halide compositions are disclosed which can be reversal-processed in fogging developers such as disclosed in U.S. Patents 2,563,785 by Ives and 2,497,875 by Falleson. Good reversal images can be obtained with internal-image silver halide emulsions even if they have some surface sensitivity. In one embodiment, the improved silver halide emulsions disclosed herein comprise an internal-image silver halide emulsion comprising a merocarbocyanine dye and a sulfonated derivative of a polynuclear carbocyclic and/or a compound of the formula:

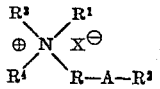

wherein $R^1$ is an alkyl or aryl group containing 1 to about 12 carbon atom, $R^2$ is an alkyl group of 1 to about 12 carbon atoms, R is an alkylene group having from 1 to about 6 carbon atoms and preferably is a methylene group, X is an anion, A is a sulfur atom or a sulfone group, and $R^3$ and $R^4$ are alkyl groups of from 1 to about 8 carbon atoms or they are together the necessary atoms to form a heterocyclic group which is preferably a monocyclic group having from 5 to 7 atoms in the ring. In another embodiment, a silver halide emulsion which has been sulfur- and gold-sensitized can be bathed in an alkylene-bis benzothiazolium salt after exposure, followed by developing in a strongly alkaline solution containing an active developing agent to produce a reversal image. In still another embodiment, a spectrally sensitized silver halide emulsion having some surface sensitivity and containing an aminoalkyl-substituted piperazine can be processed in a developer according to Ives, U.S. Patent 2,563,-785, to obtain a reversal image.